Patented Jan. 20, 1942

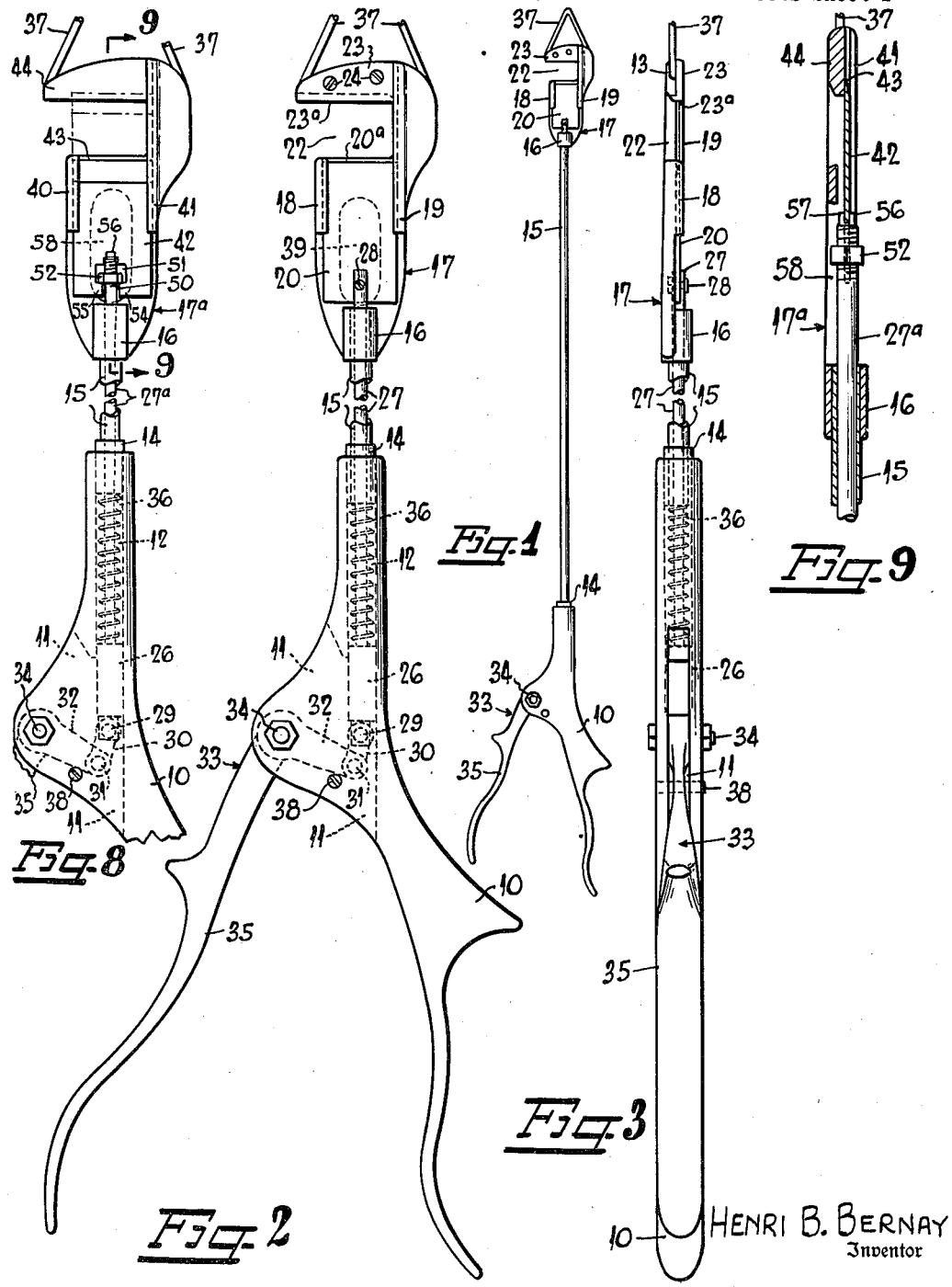

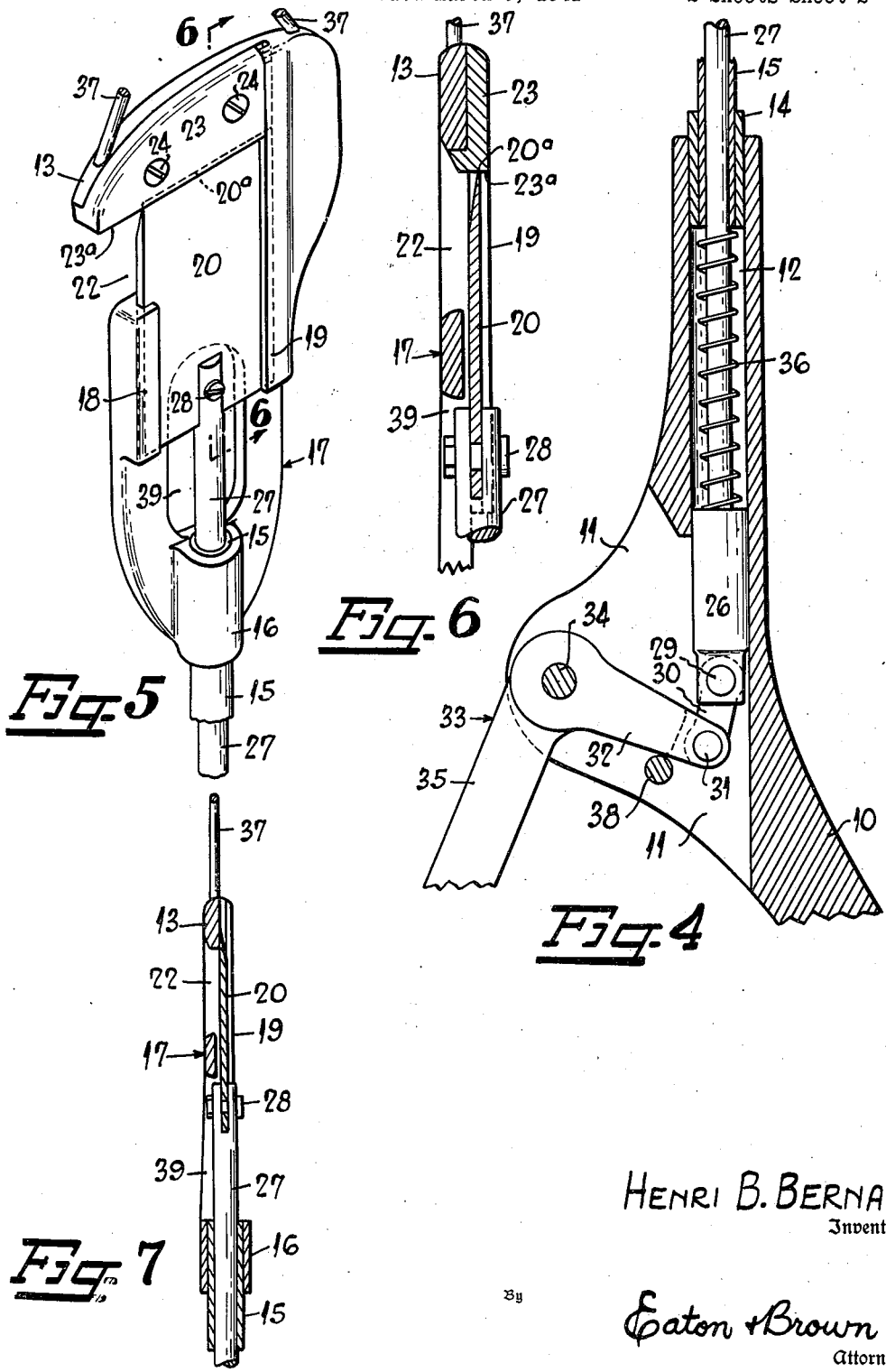

2,270,495

UNITED STATES PATENT OFFICE 2,270,495

PRUNING IMPLEMENT

Henri B. Bernay, Charlotte, N. C., assignor, by direct and mesne assignments, of one-third to Ralph H. Bouligny and one-third to Oliver R. Rowe, both of Charlotte, N. C.

Application March 3, 1941, Serial No. 381,558

8 Claims. (Cl. 30—184)

This invention is an improvement in my former patent, No. 2,184,332 and relates to pruning implements for trees, shrubbery and the like. The present invention especially relates to a device of this nature having a long reach and capable of being operated by one hand.

Although the conventional pole pruner can reach a considerable distance, it has the disadvantage of having to be operated with both hands. The conventional hand pruner has the advantage of being operated with one hand, but its reach is limited to a few inches more than one's arm length and is generally used in the pruning of twigs, sucker growth, in fruits and ornamental trees, grape vines, rose bushes and shrubbery. In pruning with the old type hand pruner, one is limited as to reach, especially in working from a ladder, the position of which one has to change quite often. It is, therefore, necessary for nurseries and many other similar concerns to keep both types of pruning implements in order to meet their demands.

It is an object of this invention to provide a hand and pole pruner having the advantages of both the conventional hand pruner and conventional pole pruner combined. The present improved pruning device enables the operator to cover a much longer radius without the necessity of changing position of the operator, thereby saving considerable time and cumbersome labor. Its light weight and proper balance, makes it an ideal pruning tool, and its long reach enables the operator to prune rose bushes and other thorny plants without the risk of injury. Also the slender stream-lined construction enables the operator to get into any nook and corner and between the thickest of growths.

It is another object of this invention to provide a pruning implement adapted to be operated by one hand and being constructed so that a bell crank handle is employed for the actuation of a cutting blade. Specifically, the invention comprises a fixed handle having a bell crank handle pivotally secured thereto, said bell crank handle having a long leg adapted to be gripped by the operator at the same time the fixed handle is gripped. The bell crank handle also has a short leg which operates a movable shearing blade as the bell crank handle is oscillated about its pivot. This type of bell crank construction makes it possible to obtain sufficient leverage so that the grip of one hand is usually sufficient to perform many pruning operations.

Some of the objects of the invention having been stated, other objects will appear as the description proceeds, when taken in connection with the accompanying drawings, in which—

Figure 1 is an elevation of one form of my improved pruning implement;

Figure 2 is an enlarged view similar to Figure 1, with the central portion thereof broken away;

Figure 3 is an elevation looking at the left-hand side of Figure 2;

Figure 4 is an enlarged longitudinal sectional view illustrating the lower central portion of Figure 2;

Figure 5 is an enlarged isometric view illustrating the upper portion of Figure 2 and showing the shearing blade in closed position where the blade contacts a suitable anvil;

Figure 6 is a vertical sectional view taken along the line 6—6 in Figure 5;

Figure 7 is a sectional view similar to Figure 6, and illustrating a slightly modified form of the invention;

Figure 8 is a view similar to the upper portion of Figure 2 but showing another slightly modified form of pruning implement;

Figure 9 is a vertical sectional view taken along the line 9—9 in Figure 8.

Referring more specifically to the drawings, the numeral 10 denotes a suitable fixed handle having a slot 11 in the central portion thereof, which slot merges into a longitudinal bore 12. The upper end of the bore 12 has a suitable bushing 14 secured therein by any suitable means such as brazing, welding or the like, and disposed in this bushing by a similar means is one end of a hollow tubular member 15. The upper end of the tubular member is fixedly secured by welding, brazing or the like into a suitable boss 16, on a bracket 17, said bracket 17 having integral therewith suitable tenon guideways 18 and 19, in which a suitable cutting blade 20 is adapted to slide. An anvil support or hook member 13 projects laterally from the upper end of bracket 17 thereby forming a notch 22. Secured to member 13 by means of screw 24 is an anvil bracket 23. It will be noted by observing Figures 2 and 5, that the cutting edge 20a of the blade 20 is normally parallel to the proximate edge 23a of the anvil 23. Also by referring to Figures 2, 5 and 6, it will be seen that the cutting edge 20a will abut the anvil edge 23a. The anvil 23 is preferably made of some soft metallic material such as copper, alloy, aluminum, or the like which will not dull the cutting edge 20a of the blade. The repeated opening and closing of the blade forms a small groove in the anvil, thus giving a shearing action on both sides of the blade. The notch 22 receives a twig, branch, or other material to be sheared.

Particular attention is called to the relative position between the right hand face of the anvil bracket 23 (Figure 6) and the cutting edge 20a of the blade 20. It is here seen that the cutting edge of the anvil 23a is very close to the right hand face of the anvil thereby making it possible to shear a twig or limb very close to the main body of the plant or tree.

The lower portion of the blade 20 (Figure 2) is secured to the upper end of a rod 27 by any suitable means such as a bolt 28. This rod is slidably mounted in the tubular member 15, previously described, and has a piston 26 fixedly secured on the lower end thereof. This piston has pivoted to its lower end as at 29 a link 30, said link having its other end pivoted as at 31 to the short leg 32 of a bell crank handle broadly designated by the reference character 33. The bell crank is pivoted as at 34 in the slot 11 of the fixed handle 10 and has a longer leg 35 which serves as a handle and is adapted to be gripped at the same time the fixed handle 10 is gripped to perform a shearing operation.

In order to normally hold the blade 20 in an open position such as shown in Figure 2, a compression spring 36 is provided around the lower portion of rod 27, between the piston 26 and the lower ends of members 14 and 15. This spring normally moves the assembly comprising members 20, 27, 26, 30, and 32 downwardly until the short leg 32 contacts a suitable stop 38 which stop spans the slot 11 in the fixed handle 10. A V-shaped pointed member 37 is secured to projection 13 so that the end of the pruning implement can be more easily inserted through thick foliage.

The bracket 17 has a slot 39 therein which is provided so that there will be ample clearance for the head of bolt 28 when the blade 20 is actuated by the rotation of bell crank handle 33.

Figure 7 shows a slightly modified form of the invention which is very similar to the preceding form except the anvil 23 is omitted thereby leaving the anvil support 13 as a stationary shearing jaw. Since the right hand edge of the jaw 13 in Figures 6 and 7 coincides with the left hand edge of the blade 20 it is possible to remove the blade 20 from the upper end of rod 27 in the preceding form and reverse its position so that the straight side of the blade will be in alinement with the right hand shearing edge of anvil support 13. In other words, by removing the anvil 23 and reversing the blade 20 the form shown in Figures 1 to 6 inclusive, can be converted into an overlapping shearing device instead of an abutting shearing apparatus in which the cutting edge of the blade engages the face of the anvil. In this case, the blade 20 would be made longer than when used with the anvil or if the same blade were used the slot 19 would be extended towards portion 13.

Figures 8 and 9 show a slightly modified form of the invention which is very similar to the preceding form shown in Figures 1 to 6 inclusive. In this form, like reference characters will be applied to like parts which are shown in the preceding form, and a description will be made only of the parts that differ. The piston 26, in this form of the invention has one end of a suitable rod 27a fixedly secured thereto and slidably mounted in the tubular member 15. The upper end of the tubular member has a bracket 17a secured thereto, said bracket 17a having tenon slides 40 and 41 in which the side edges of a shearing blade 42 are adapted to slide.

The upper edge of the shearing blade 42 has a cutting edge 43, which edge is adapted to move upwardly to the dot-dash line position in Figure 8 when a shearing operation is performed. In this uppermost position the shearing edge of this blade overlaps a laterally extending jaw 44 (Figure 9) instead of abutting the same as in Figure 5. In other words, a shearing action is performed as a result of the blade 42 passing beyond the lower edge of jaw 44 to the position shown in Figure 9.

Blade 42 has a notch 50 near its lower edge, said notch 50 merging into a larger notch 51 as it increases in depth. These two notches are relatively positioned so that a pair of inwardly oppositely disposed spaced projections 54 and 55 are formed. The upper end of rod 27a is adapted to fit between these projections and extend into enlarged notch 51. Threadably secured around the upper end of rod 27a and within the enlarged notch 50 is a nut 52, said nut 52 being adapted to contact the upper portions of projections 54 and 55 to thereby force the upper end of the rod 27a against the upper sidewall or base of notch 51.

It will be noted by observing Figure 9 that the upper end of rod 27a has a suitable slot cut therein, which slot is disposed between projections 56 and 57. This slot is adapted to confine a portion of the blade 42 therebetween when the blade is properly mounted on the upper end of the rod.

A suitable slot 58 is provided in the bracket 17a so that ample clearance will be provided for nut 52 during the operation of the blade. When the bell crank lever 33 is operated, the piston 26 and rod 27a are moved upwardly and the blade is forced past the stationary jaw 44 to overlap the same when in uppermost position. Spring 36 serves to hold the blade 42 in retracted position as shown in Figure 8. The blade can be easily detached for grinding or exchanging by merely loosening the nut 52 to permit the projection 56 and 57 to release the intermediate portion of the blade 58.

In the drawings and specification there has been set forth a preferred embodiment of the invention and although specific terms are employed, they are used in a generic and descriptive sense only and not for purposes of limitation, the scope of the invention being set forth in the following claims.

I claim:

1. A pruning implement comprising a fixed handle, an anvil secured to one end of the handle, a blade having a cutting edge adapted to move toward and away from the anvil, a rod slidably mounted in said fixed handle and having one end thereof secured to said blade, and a bellcrank pivotally secured to said fixed handle, said bellcrank having a short leg pivotally connected to the other end of said rod, and a longer leg adapted to be gripped by an operator's hand along with the fixed handle when it is desired to actuate the blade.

2. A pruning implement comprising a fixed handle, an anvil secured to one end of the handle, a blade having a cutting edge adapted to move toward and away from the anvil, a rod slidably mounted in said fixed handle and having one end thereof secured to said blade, a link having one end pivotally connected to the other end of said rod, a bellcrank pivotally secured to said fixed handle, said bellcrank having a short leg pivotally connected to the other end of said link, and a longer leg adapted to be gripped by an operator's hand along with the fixed handle when it is desired to actuate said blade.

3. A pruning implement comprising a fixed handle, an anvil secured to one end of the handle, a blade having a cutting edge adapted to move toward and away from the anvil, a rod slidably mounted in said fixed handle and having one end thereof secured to said blade, said anvil having a contact edge for said cutting edge disposed substantially at 90 degrees to the longitudinal axis of said rod and said cutting edge being parallel to said contact edge, and a bellcrank pivotally secured to said fixed handle, said bellcrank having a short leg pivotally connected to the other end of said rod, and a longer leg adapted to be gripped by an operator's hand along with the fixed handle when it is desired to actuate said blade.

4. A pruning implement comprising a fixed handle, an anvil secured to one end of the handle, a blade having a cutting edge adapted to move toward and away from the anvil, a rod slidably mounted in said fixed handle and having one end thereof secured to said blade, said anvil having a contact edge for said cutting edge disposed substantially at 90 degrees to the longitudinal axis of said rod and said cutting edge being parallel to said contact edge, a link having one end pivotally connected to the other end of said rod, a bellcrank pivotally secured to said fixed handle, said bellcrank having a short leg pivotally connected to the other end of said link, and a longer leg adapted to be gripped by an operator's hand along with the fixed handle when it is desired to actuate the blade.

5. A pruning implement comprising a fixed handle, an anvil secured to one end of the handle, a blade having a cutting edge adapted to move past said anvil to perform a shearing operation, said blade having an edge slot cut therein which increases in width as its depth increases thereby forming a pair of spaced oppositely disposed projections, a rod slidably mounted in said fixed handle and having one end thereof adapted to fit in said slot, a nut threadably secured around the end of said rod and disposed in the enlarged portion of said slot, said nut being adapted to fit against said projections to press the end of the rod against the base of the slot, and a bellcrank pivotally secured to said fixed handle, said bellcrank having a short leg pivotally connected to the other end of said rod and a longer leg adapted to be gripped by an operator's hand along with the fixed handle when it is desired to actuate said blade.

6. A pruning implement comprising a stock member having a handle projecting therefrom, a second handle pivotally secured intermediate its ends to the stock member, a tube extending from the stock member, said stock member having a bore therein in alinement with the tube, a head secured on the other end of the tube, said head having a notch therein disposed at right angles to the longitudinal axis of the tube, a pair of guideways in the head, a cutting blade mounted for sliding movement in the guideways, the cutting edge of the blade being adapted to move against the remote side wall of the notch in a cutting operation, a rod slidably mounted in the stock member and in said tube and projecting into said head, means for securing the rod to the blade, a compression spring disposed around said rod and in said bore for normally holding the blade in open position, and a pivotal connection between the second handle and the rod.

7. A pruning implement comprising a stock member having a handle projecting therefrom, a second handle pivotally secured intermediate its ends to the stock member, a tube extending from the stock member, said stock member having a bore therein in alinement with said tube, a head secured on the other end of the tube, said head having a notch therein disposed at right angles to the longitudinal axis of the tube, a pair of guideways in the head, a cutting blade mounted for sliding movement in the guideways, the cutting edge of the blade being adapted to move against the remote side wall of the notch in a cutting operation, a rod slidably mounted in the stock member and in said tube and projecting into said head, means for securing the rod to the blade, a compression spring disposed around said rod and in said bore for normally holding the blade in open position, said blade being bevelled and adapted when in one position to contact the far side wall of the notch near one edge, and when turned a half-turn and again secured to the rod, being adapted to contact the far side wall of the notch near the other edge, and a pivotal connection between the second handle and the rod.

8. A pruning implement comprising a stock member having a handle projecting therefrom, a second handle pivotally secured intermediate its ends to the stock member, a tube extending from the stock member, said stock member having a bore therein in alinement with said tube, a head secured on the other end of the tube, said head having a notch therein disposed at right angles to the longitudinal axis of the tube, a pair of guideways in the head, a cutting blade mounted for sliding movement in the guideways, the cutting edge of the blade being adapted to move against the remote side wall of the notch in a cutting operation, a rod slidably mounted in the stock member and in said tube and projecting into said head, means for securing the rod to the blade a compression spring disposed around said rod and in said bore for normally holding the blade in open position, the far side wall of the notch having a removable face so that when the face is removed the cutting edge of the blade will slide past the permanent portion of the head and produce a shearing action between the blade and the outer portion of the head defining the outer side wall of the notch, and a pivotal connection between the second handle and the rod.

HENRI B. BERNAY.